United States Patent [19]

Douglas

[11] 3,757,730

[45] Sept. 11, 1973

[54] WIND ACTUATED DEVICES

[75] Inventor: Donald J. Douglas, White Bear Lake, Minn.

[73] Assignee: Nu-Pro, Inc., Saint Paul, Minn.

[22] Filed: Sept. 21, 1972

[21] Appl. No.: 290,785

[52] U.S. Cl............................ 116/28, 40/39, 415/208
[51] Int. Cl.......................................................... B60q
[58] Field of Search...................... 116/28, 63, 63 P, 116/114, 173; 46/58, 53, 34, 178; 40/37, 37.1, 39; 350/99; 415/209, DIG. 1

[56] References Cited
UNITED STATES PATENTS

| 214,694 | 4/1879 | Oliver | 40/39 |
|---|---|---|---|
| 332,249 | 12/1885 | Graham et al. | 415/208 |
| 1,575,242 | 3/1926 | Willoughby | 415/208 X |
| 2,781,017 | 2/1957 | Fuller et al. | 116/63 P |
| 2,948,257 | 8/1960 | Levey | 116/63 |
| 2,965,991 | 12/1960 | Simmons | 40/39 |
| 3,320,920 | 5/1967 | Lusebrink | 116/28 |

Primary Examiner—Louis J. Capozi
Attorney—Robert C. Baker

[57] ABSTRACT

The wind actuated devices disclosed have a critical stationary wind shield which serves in combination with other features of the devices to promote desired wind actuated rotation of a rotatable part. The devices have at least one primary rotatable part, an axis means establishing a predetermined axis for rotation of the primary rotatable part, and holding means for the axis means. The primary rotatable part comprises a form-retaining base sheet material which is aligned with substantially all portions of it extending substantially parallel with the predetermined axis for its rotation. The axis for its rotation lies in the plane of the sheet and bisects the sheet into two wing parts. The wing parts are symmetrical and contoured in opposite directions to facilitate wind actuated rotation. Rotation causes each wing part to generate a solid of revolution having a curved surface extending about the axis of rotation. The wind shield is mounted in spaced proximate relationship to the rotation-generated curved surface at a radial location effective, under conditions of use in a wind environment, to interrupt external wind flow upon at least a portion of the sheet material at a wing part moving into the wind during rotation, but not to interrupt external wind flow upon the sheet material at a wing part moving with the wind during wind actuated rotation. Transparent wind shields are preferred, especially in combination with eye-catching attention-getting features including patterned areas of reflex reflecting and fluorescent materials on the base sheet material. Adjustable mounting bars are disclosed for fixing the devices to bicycles or the like.

20 Claims, 6 Drawing Figures

PATENTED SEP 11 1973　　　　　　　　　　　　　　3,757,730

WIND ACTUATED DEVICES

This invention relates to wind actuated devices, and more particularly to wind actuated devices equipped with a stationary wind shield which serves in combination with other features of the devices to promote desired wind actuated rotation of a rotatable part. The invention is also directed to eye-catching attention-getting safety devices incorporating the wind shield feature in combination with patterned areas of reflex reflection (preferably also with florescent patterns) on a rotatable part.

Of course, a wide variety of spinning or rotatable devices are known, some including rotating reflex-reflectors; and the following U. S. patents are illustrative: Oliver U.S. Pat. No. 214,694; Warner U.S. Pat. No. 1,225,379; Dodson U.S. Pat. No. 1,258,541; Canby U.S. Pat. No. 1,275,384; Addition U.S. Pat. No. 1,798,052; Valk U.S. Pat. No. 1,906,668; Learnard U.S. Pat. No. 2,679,711; Fuller et al. U.S. Pat. No. 2,781,017; Gladen U.S. Pat. No. 2,797,621; Sly U.S. Pat. No. 2,890,536; Barker U.S. Pat. No. 2,943,416; Levey U.S. Pat. No. 2,948,257; Simmons U.S. Pat. No. 2,965,991; Trigilio U.S. Pat. No. 3,292,569; Lusebrink U.S. Pat. No. 3,320,920; and Beaubien U.S. Pat. No. 3,391,487.

However, a basic problem with prior art devices, and a problem which appears to have been heretofore unrecognized (or at least a problem to which no one heretofore, insofar as is known, has offered a practical solution), is that of what might be called a "kiting" effect. This effect is especially pronounced in devices having a rotator formed of a base sheet with the axis of rotation lying in the plane of the base sheet and bisecting it into essentially equal parts. Even when the extremities of the base sheet are curved in opposite directions, as has been done heretofore in an effort to facilitate wind rotation of the base sheet, the actual step of wind initiation of the rotation of the base sheet can be a problem. An even flow of wind striking a stationary base sheet of this type at an angle essentially perpendicular to the base sheet (so that both sides or wings of the base sheet outwardly from its axis receive the force of the wind) will rarely be effective to initiate rotation of the base sheet. Most frequently, the base sheet will remain stationary, possibly because the force of the wind on each wing part of the base sheet is so close to being equal that the slightest resistance at the mounting of the axis shaft for the device is enough to overcome any slight aerodynamic differential in effective wind force on the wings of the base sheet. Also, a vacuum or reduced pressure pattern behind the base sheet is believed to contribute to the stubborn resistance of the sheet against going into rotation under the noted conditions. Indeed, the resistance or reluctance of base sheets of the noted type to be triggered into rotation simply by applying a wind force to them has been noted even when the wind force has been applied at an angle other than substantially perpendicular. Of course, once they start to rotate, (and a slight push by hand is enough to cause them to start), they are kept in motion by the wind.

The present invention provides an improved arrangement of elements which contributes greatly to wind initiation or actuation of the rotation of rotators of the aforenoted type. Indeed, substantially reliable wind initiation of rotation is possible by practicing the teachings herein.

A critical feature of the invention is a wind shield which serves in combination with other structural features of the devices hereof to cause wind initiation of rotation.

Also provided by the invention are devices of an eye-catching attention-getting quality useful as safety devices on bicycles, slow moving vehicles, and the like, where reliable wind initiated rotation is most needed.

Wile the teachings hereof are primarily useful in safety devices (especially safety devices for alerting motorists to the presence of a person or object or hazard on or near a highway), they are also useful in a variety of novelty or advertising devices where substantial reliability of wind initiation of rotation is of no small importance.

Wind actuated devices of this invention comprise at least one primary rotatable part actuatable into rotation by wind acting thereupon. They have an axis means which establishes a predetermined axis about which rotation of the primary rotatable part is adapted to take place. A holding means is provided for the axis means so as to permit rotation of the rotatable part.

The primary rotatable part comprises a form-retaining base sheet material aligned with substantially all portions thereof extending substantially parallel with the aforenoted predetermined axis. That axis lies in the plane of the sheet material and substantially bisects the sheet material into two wing parts. The wing parts extend outwardly from the axis and are substantially symmetrical in shape. They also are contoured in opposite directions to facilitate wind actuated rotation of the sheet material in a rotary direction opposite that of the direction of the wing contours. Rotation of the sheet material causes the wing parts to generate or circumscribe substantially a single solid of revolution having a curved surface extending about the axis of rotation.

The important improvement in these devices is characterized by the feature that a wind shield is structurally mounted in spaced proximate relationship to the aforenoted rotation-generated curved surface; and this wind shield is at a radial location (with respect to the rotation-generated curved surface) such that the wind shield is effective, under conditions of use of the device in a wind environment, to interrupt external wind flow upon at least a portion of the sheet material at a wing part thereof moving toward the wind during wind actuated rotation of the sheet material. However, the wind shield and its location is not effective to interrupt external wind flow upon the sheet material at a wing part thereof moving with the wind during wind actuated rotation of the sheet material.

Preferred devices of the invention incorporate patterned areas of reflex-reflecting material and of non-reflex-reflecting material on opposite sides of the base sheet material or rotator. The patterned area of reflex-reflecting material on one side of the sheet material is preferably relatively displaced in axial relationship from the patterned area of reflex-reflecting material on the other side thereof. Further, at least 50 percent of the area coverage of each reflex-reflecting pattern on opposite sides of the sheet material is most desirably in locations (relative to the axis means for the rotation of the sheet material) which do not coincide as viewed during rotation of the rotatable part. The patterned areas of non-reflex-reflecting material on opposite sides of the sheet material also are preferably relatively displaced in axial relationship to each other. This arrangement causes the result that, at substantially all practical rotation speeds for the primary rotatable part or rotator about the predetermined axis, a viewer under reflex-reflecting conditions is given the impression of shifting or jumping flash patterns of light return suggestive of the patterns of the areas of reflex-reflecting material.

Devices wherein the wind shield is formed of transparent material are especially desired where reflex-reflecting patterns, or other indicia preferably not masked out, are incorporated in the structure.

Devices equipped with a deformable mounting bar permit advantageous flexibility in mounting on vehicles, especially bicycles, motorcycles, farm machinery, and the like.

The invention will further be described by reference to a drawing, made a part hereof, wherein.

Figure 3:
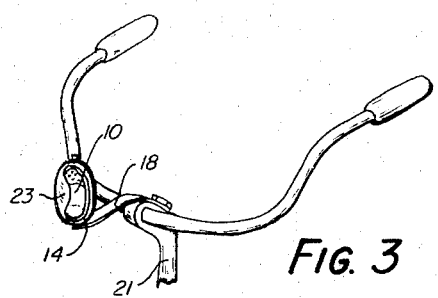
FIGS. 3 and 4 are each schematic perspective views of a wind actuated device fixed, respectively, to the handlebar and seat post of a bicycle.

The safety device illustrated in FIGS. 1 and 2 will first be described. That device comprises a rotatable part 10 which is a form-retaining base sheet material. "Form-retaining," as used herein, means a rigid or semi-rigid or even somewhat flexible type material, but one which, after possible deformation under pressure, returns to its original shape or contour. Generally such sheets are relatively stiff. This part 10 is actuatable into rotation by wind acting thereupon. An axis means 11, suitably formed by stub shaft elements 12 and 13, is provided and establishes a predetermined axis about which rotation of the primary rotatable part takes place. Stub pivot elements 12 and 13 extended outwardly from perimeter portions of the rotatable sheet material part 10. Rotatable sheet part 10 is illustrated as essentially circular or disk-like in overall perimeter shape; although the precise perimeter shape may vary. The axis pins 12 and 13 suitably may be molded or formed at the same time part 10 is formed. Illustratively, these parts may be formed out of organic plastic materials such as polystyrene, polyethylene, polyvinyl chloride (or any of a variety of organic plastic materials) as well as, if desired, aluminum, or any of a variety of metallic or metal materials.

A closed loop frame 14 of ring-like character, suitably with a reinforcing ridge 15, serves as a stationary protective frame for rotatable part 10 and for holding the axis pins 12 and 13 for it. Bearing surfaces or socket recesses 16 and 17 are suitably molded as an integral part of frame 14 for receiving the pivot stubs or shafts 12 and 13 in a manner permitting their rotation.

Figure 4:
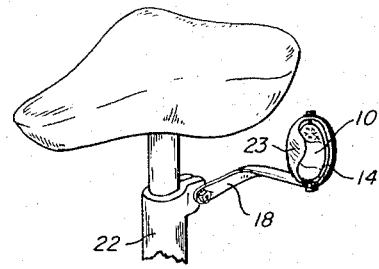

A bracket or mounting bar 18 may be riveted or otherwise fixed to frame 14, especially at a reinforced portion 19 thereof; and the bar 18 preferably is in the nature of a strip or band of malleable non-resilient, but deformable material or metal, for example, tin or a tin alloy. An important characteristic exhibited by the mounting bar 18 is its easy deformability by hand bending. Suitably, mounting bar 18 is fixed to frame 14 by a nut and bolt arrangement 20. Thus, one end of bar 18 is fixed to the frame 14 of the device. The other end of bar 18 (suitably also provided with a bolt hole) is conveniently fixed to either the handlebar post 21 or the seat post 22 of a bicycle (suitably using bolts and nuts pre-existing at those locations on the bicycle), as illustrated in FIGS. 3 and 4 respectively. The hand deformability of bar 18 permits adjustment of the orientation of the wind actuated device after it is mounted on the bicycle; and this deformability feature is also especially attractive from the standpoint of reducing breakage. Bumping the wind actuated device as it is mounted on a bicycle or other machine may displace it temporarily; but the flexibility of the mounting takes up shocks and yields to save the device from breakage.

Important relationships and features of the rotatable part 10 and the wind shield 23 will now be discussed.

The base sheet 10 is aligned or disposed so that substantially all portions of it extend substantially parallel with the axis 11. Further, axis 11 lies in the plane of sheet 10 and bisects sheet 10 into essentially two equal parts, at least from an aerodynamic standpoint. The two parts are conveniently called wing parts 24 and 25. These wing parts 24 and 25 extend outwardly from the axis 11, and are substantially symmetrical in shape. They are each contoured, at least in outward portions from axis 11. Generally they are contoured in a continuous or gradually sweeping manner as one examines them from axis 11 to their outermost perimeter or peripheral edges. They are curviplanar. The contour of wing parts 24 and 25 is in opposite directions from axis 11 to create oppositely outturned leading and trailing edges removed from the axis 11 of rotation. The contour facilitates wind actuated rotation of the sheet 10 in a rotary direction opposite that of the direction of the contour. Thus, for the showing in FIG. 2, the rotation of sheet 10 is in a clockwise direction, whereas the contour of each wing part 24 and 25 is in a generally counter-clockwise direction. The overall appearance of sheet 10 in cross-section approximates or suggests the shape of an S of very gradual character.

A characteristic of a rotator or sheet material 10 (whether it happens to be a disk or square or a rectangle or some other peripheral shape) is that rotation of it about its axis causes each wing part 24 and 25 to generate a solid of revolution about the axis 11. In practice, the solid of revolution so generated by one wing part essentially coincides with the solid of revolution generated by the other wing part. Thus, the wing parts generate substantially a single solid of revolution on rotation; and that solid of revolution has a curved surface extending about the axis 11. The important conceptual point to recognize is that the peripheral edges of the wing parts trace or transcribe the dimensions of the solid of revolution, and consequently establish the character of the curved surface for that hypothetical solid about axis 11. The curvature of this rotation-generated curved surface will be globe-like for a disk sheet 10; but for other sheet shapes it could be cylindrical or cone-like, or of still another form.

Wind shield 23 is structurally mounted in a spaced but proximate relationship to the rotation-generated curved surface aforediscussed. Shield 23 is spaced from that curved surface so as not to interfer with rotation of sheet 10; but the spacing is preferably no greater than reasonably necessary to insure that sheet 10, even if it wobbles at the mounting for its stub shafts 12 and 13, will not strike or rub against shield 23 during rotation. Further, the spacing should be great enough to avoid any significant aerodynamic drag effect as the peripheral edges of sheet 10 pass by shield 23 during rotation. Generally, shield 23 should be curved in a manner approximating the curvature of the rotation-generated curved surface; and a global segment is a desired shape for a shield as illustrated in FIGS. 1 and 2.

Shield 23 suitably is fixed to frame 14 of the device, either as an integral part of frame 14 (and suitably shaped and molded at the time frame 14 is formed), or as a separate structural element attached to frame 14 by some suitable fastening means (such as an adhesive, or rivets, or cooperative male and female snap elements or the like). Normally shield 23 projects off one side of a frame member, as illustrated; but there should be no objection to a shield which extends or projects from each side of a frame element.

The important feature is that shield 23 is mounted in the spaced proximate relationship to the rotation-generated curved surface at a radial location which is effective, under conditions of practical use, to promote wind initiation of the rotation of sheet 10. Referring to FIG. 2, if we assume that external wind flow is from above FIG. 2 toward the bottom of the page of the drawing, then it becomes evident that shield 23 will interrupt external wind flow upon at least a portion of the sheet 10 at wing part 24, as wing part 24 moves toward the direction of the external wind during the rotation of sheet 10 about axis 11 in a clockwise direction. Similarily, as wing part 25 moves clockwise and occupies the position of wing 24 in FIG. 2, it also will be protected, at least in part, from the effect of the assumed external wind flow. Thus, shield 23 will effectively divert at least some of the external wind from the wing part moving into or toward the external wind during the rotation of sheet 10. But of equal importance, shield 23 will in no sense significantly interrupt the full effect of the external wind flow upon sheet 10 at the wing part thereof moving with the wind during rotation of sheet 10. Thus, the position illustrated for wing part 25 in FIG. 2 will receive the full force of the wind, which will contribute to rotation of sheet 10. Most important, the arrangement is such that wind initiation of rotation for sheet 10 is reliably accomplished. This feature is especially dramatic for devices mounted on bicycles, with shield 23 at a forward location and frame 14 located approximately transversely or perpendicularly to the length of the bicycle, and therefore transverse to its direction of travel. Stated another way, shield 23 is in one of the two quadrants of the rotation-generated curved surface of the device facing toward the external wind flow. As a practical matter, axis 11 normally will be toward the vertical but not necessarily truly vertical in use applications. Movement of the vehicle causes an effective head-on wind flow which actuates rotation of the sheet material of the devices.

Shield 23 is suitably formed of transparent organic plastic, for example, polystyrene, cellulose acetate butyrate, or any other suitable plastic. Transparency is especially desired for shields on reflex-reflecting rotators mounted in the advanced or head position on a vehicle. However, opacity (as suitably gained by pigmentation of plastics or by use of opaque materials such as metals) is generally suitable and even desired for shields on devices mounted and color coded to indicate the tail end of a vehicle. Further, the size of shields (especially for devices used for marking the trailing end of a vehicle) may be quite large, even so large as to occupy essentially a full quadrant of the rotation-generated curved surface of the solid formed by rotation of sheet 10. A large opaque shield contributes to the masking out of the attention-getting characteristics of a rotating device as viewed toward the leading end of a moving vehicle carrying the device, but does not mask out those characteristics for one approaching and viewing the trailing end of the vehicle.

The width of the wind shield 23, in terms of the circumference of the rotation-generated curved surface aforenoted, should be at least about 1/20 or 1/16 up to about ¼ of the circumference of that surface. Normally, a width approximating about 1/10 or ⅛ of that circumference is most desirable; and optionally a pattern of holes or openings may be employed in the shield.

From a length standpoint, considered in terms of the height of the base sheet 10 along axis 11, the shield should be at least about 1/20 or 1/16 the height of the base sheet at its axis, and usually is at least 1/10 that height. Length of the shield in terms as just noted, may exceed the height of the base sheet 10 at its axis without loss of required performance. Preferably, however, the shield length is no greater than about 9/10 the height of the sheet 10 at its axis, and is medially located between the extremities of the height of the sheet 10 at its axis. This feature of medial (and radially outward) location is illustrated for the shield 23 in FIG. 1.

Especially desirable are devices of the invention which incorporate reflex-reflecting features of a jumping character. Various reflex-reflecting materials may be employed for this purpose, including cube-corner reflex-reflectors as well as bead-type reflex-reflectors. The bead-type, however, are preferred; and the following illustrative bead-type reflex-reflection teachings are here incorporated by reference: U.S. Pat. No. 2,326,634 to Gebhard et al. and U.S. Pat. No. 2,407,680 to Palmquist.

Reflex-reflecting surfaces cause an incident beam of light impinging upon the same to be retro-directed or reflex-reflected back toward the direction of the light source itself. The light is returned or reflex-reflected in a cone having the incident or original light beam as its axis, even when the incident beam strikes the reflex-reflecting surface at angles rather substantially away from a true normal angle (that is, 90° or perpendicular to the surface).

Significantly, by employing patterned areas of reflex-reflection, preferably with patterned areas of florescent material, strong attention-getting qualities are built into the device, and jumping or leaping light return patterns are functionally possible at practically any location throughout a circle of 360° about the device.

The patterned areas of reflex-reflecting material will now be discussed. On one face side of sheet 10 is located a patterned area 26 of reflex-reflecting material. The reflex-reflecting material may consist of a flexible prefabricated sheet 26 adhesively fixed on base sheet part 10. As shown in FIG. 1, the area 26 covers all portions of the area of the base sheet material 10 from one stub pivot 12 up to about ¼ the axial distance across part 10 from stub 12 to stub 13. The remaining ¾ of the face side of the base sheet 10, as viewed in FIG. 1, is illustratively entirely free of reflex-reflecting material, and is non-reflex-reflecting.

Figure 1:
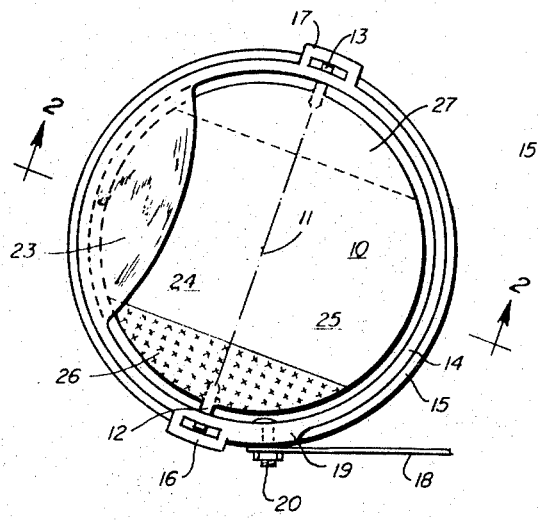
FIG. 1 is a plan view of a wind actuated device of the invention, with a mounting bar fixed to the frame of the device.
Figure 2:
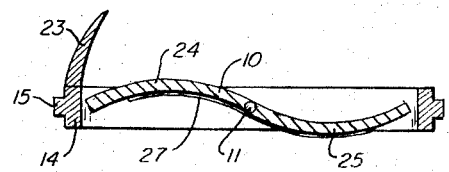
FIG. 2 is a cross-section taken on line 2—2 of FIG. 1.

Conversely, the reverse side of the base sheet material 10, as viewed in FIG. 1, is equipped with a pattern of reflex-reflecting material 27 extending up to about ¼ of the axial distance across part 10 from the pivot stub 13 toward stub 12. Apart from the two noted reflex-reflecting portions 26 and 27 on opposite sides of the base sheet 10, the surfaces of part 10 are non-reflex-reflecting. Those remaining surface portions suitably may be coated with florescent material or a florescent paint (to provide daytime brillance), but preferably are not coated or formed with a specular or mirror-type reflecting material. If the rotatable disk 10 is formed out of metal exhibiting a specular reflecting character, all portions not covered by the pattern of reflex-reflecting material preferably are painted or covered with florescent paint or layer, or a non-florescent but diffuse reflecting paint or layer. The reason for this is to remove interference for the reflex-reflecting pattern as would be caused (under some but not all conditions of reflex-reflective viewing) by a specular or mirror reflecting surface adjacent a reflex-reflecting pattern area on rotatable part 10.

Reference to viewing under relex-reflecting conditions, as used herein, refers to viewing at a location generally radially outward from (and not in line with) the axis of rotation for the primary rotatable part of the device, and with the eyes of the viewer near a source of incident light striking the device (such as, for example, is the characteristic viewing circumstance for the driver of an automobile with the auto headlights operating).

An important feature is that the area of reflex-reflection identified at numeral 26 becomes viewable only once during each complete revolution of the rotatable part 10. Likewise, the area identified by numeral 27 becomes viewable only once on each complete revolution of rotatable part 10.

Also important is the fact that at least 50 percent of the area coverage of each reflex-reflecting pattern on opposite sides of the sheet material is in locations, relative to the axis 11, which do not coincide as viewed during rotation of the rotatable part. In other words, a face view of one side, followed by a face view of the other side, will reveal to the viewer that at least 50 percent of the reflex-reflecting area coverage on one side lies in areas not reflex-reflecting when the base sheet material is reversed for viewing its opposite or other side. As a practical matter, preferred pattern arrangements are such that 100 percent of the pattern on one side does not coincide with the other when the base sheet material is reversed. But in all cases, even when slight overlapping of pattern impressions occurs on rotation, the reflex-reflecting areas on opposite sides are relatively displaced in axial relationship, that is, in their relative orientation to the axis 11. In fact, they are preferably very substantially spaced from each other on opposite sides of rotatable sheet 10 in a direction parallel with the axis—not only with no axial overlapping or coinciding of the pattern on one side with the pattern on the other, but with a substantial non-reflex-reflecting space between.

The substantial spacing in an axial direction (or direction parallel to the axis), plus the fact that the areas of reflex-reflection extend across the axis of rotation as viewed under reflex-reflecting condition, together with the requirement of a complete revolution before either area of reflex-reflection repeats or unfolds itself, and even to some extent, the substantially continuous contour of the rotatable sheet 10 from the axis 11, all contribute to the desired feature of providing a viewer, under reflex-reflecting conditions, with the impression of jumping flash patterns of light return which are resolvable under substantially all practical conditions as flash patterns or flickers by the human eye. The patterned reflex-reflecting areas illustrated in FIG. 1, (which are axially displaced and extend across the axis of rotation) tend to give the result of "unfolding," with each presenting itself only once and only momentarily during each complete revolution, which effectively causes the result of a momentary maximum retrodirection of incident light at a particular area on the device just once during each revolution. The arc sweeping aspect inherent for any portion of a reflex-reflecting area extending radially outward from the axis of rotation is substantially overcome or minimized by virtue of the "unfolding" characteristic of reflex-reflecting patterns which extend over the axis of rotation, as illustrated in FIG. 1. Such is to be distinguished from a blurring swashbuckling or streaking effect characteristic of arc sweeping reflecting areas spaced from the axis of rotation and not extending over the axis.

As a general rule, the pattern of reflex-reflection on one side of the base sheet 10 should be, or preferably is, substantially identical in overall shape to that on the other side of the sheet 10. But, the pattern frequently is preferably inverted on one side with respect to the other. Thus, the pattern 26 is substantially the mirror image of the pattern 27 on the reverse side, or vice versa. While circular patterns may be employed, non-circular patterns (or patterns whose perimeter is non-circular) of reflex-reflection are vastly preferred from the standpoint of creating recognizably distinct flash return of light on rotation of the device under reflex-reflecting conditions. Circular patterns, even when portions of the interior are broken away or removed to create an image which appears recognizably different on forming a mirror inversion of it, are nevertheless not preferred simply because the human eye, on very rapid rotation of the rotatable part 10, is somewhat taxed to resolve a detailed specially created design of non-reflex-reflecting character within the circle. Under all circumstances, a full disk of reflex-reflection is not preferred as a pattern. Geometric patterns of some other perimeter shape, such as triangle, rectangle, oval, half moon, a strip, or the like (but preferably not optional alphabet letters or numbers), are much more attention-getting and do not appear as a "light bulb." Even a relatively large ring can give useful preferred type results. But solid disk-like reflex-reflectors generally are not preferred. However, cube-corner reflex-reflectors of varied pattern shapes can be useful, especially where flexible cube-corner sheet materials are employed in making the patterns.

The most preferred pattern arrangements for shifting reflex-reflection are axially separated on opposite sides by an axial spacing distance of at least about ⅛ the axial distance of the rotatable sheet material (the distance of separation being preferably greater as anticipated rate of rotation increases), with all other areas covered with florescent material for daytime attention-getting properties. Optionally, the florescent pattern areas may be separated by an axial spacing distance equal to or lesser or greater than that for the areas of reflex-reflection.

Figure 5:
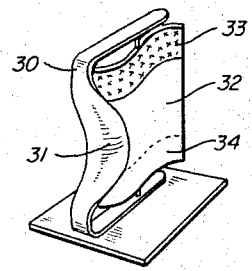

While a loop frame as illustrated in FIG. 1 contributes to protection for the rotating part 10, a C-frame as illustrated in FIG. 5 is also useful. The C-frame 30 in FIG. 5 is suitably contoured into a wind shield expansion 31 having the performance features aforediscussed. The rotatable sheet 32 in FIG. 5 is illustrated as having an essentially square perimeter; and, as in the case of the sheet 10 for FIG. 1, sheet 32 is contoured and provided with reflex-reflecting patterns 33 and 34 on opposite sides of the sheet, with other portions coated with a florescent paint.

Figure 6:
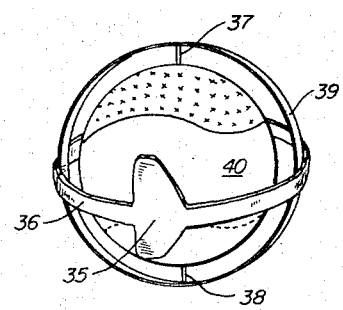
FIGS. 5 and 6 are schematic perspective views illustrating alternate embodiments of the invention.

In FIG. 6, the wind shield 35 is illustrated as being mounted on an "equator" band or frame 36 about a rotatable sheet 40, with the stub shafts 37 and 38 for the axis of rotation of sheet 40 mounted in bearings held by loop frame 39.

A great many variations of specific structure are possible while retaining the essential benefits of the invention. Also, if desired, more than one rotatable sheet material or part may be incorporated in these devices while retaining the essential wind shield performance for promoting positive wind initiation of rotation and the maintenance of rotation as the device, mounted on a vehicle, is moved into the wind. As will be readily appreciated, the most frequently or commonly experienced wind condition for devices mounted on moving vehicles is that of moving into the wind—the head-on wind force and the velocity of it being largely generated as a result of the rate of motion chosen for the vehicle.

That which is claimed is:

1. In a wind actuated device comprising at least one primary rotatable part actuatable into rotation by wind acting thereupon, an axis means establishing a predetermined axis about which rotation of said primary rotatable part is adapted to take place, and holding means for said axis means to permit said rotation, with said primary rotatable part comprising a form-retaining base sheet material aligned with substantially all portions thereof extending substantially parallel with said predetermined axis, with said axis lying in the plane of said sheet material and substantially bisecting said sheet material into two wing parts, with the wing parts of said sheet material outwardly from said axis being substantially symmetrical in shape and contoured in opposite directions to facilitate wind actuated rotation of said sheet material in a rotary direction opposite that of the direction of said contour, and with said rotation of said sheet material causing said wing parts to generate substantially a single solid of revolution having a curved surface extending about said axis, the improvement characterized by the feature that a wind shield is structurally mounted in spaced proximate relationship to said rotation-generated curved surface at a radial location effective, under conditions of use of said device in a wind environment, to interrupt external wind flow upon at least a portion of said sheet material at a wing part thereof moving toward said wind during said wind actuated rotation, but not to interrupt external wind flow upon said sheet material at a wing part thereof moving with the wind during said wind actuated rotation.

2. The device of claim 1 wherein said wind shield is substantially transparent.

3. The device of claim 1 wherein said wind shield is substantially opaque.

4. The device of claim 1 wherein said holding means for said axis means comprises a frame structure and said wind shield is fixed to said frame structure.

5. The device of claim 1 wherein said wind shield is curved in a manner approximating the curvature of said rotation-generated curved surface.

6. The device of claim 1 wherein the width of said wind shield in terms of the circumference of said rotation-generated curved surface is between approximately 1/20 and ¼ of said circumference.

7. The device of claim 1 wherein the length of said wind shield in terms of the height of said base sheet material along said predetermined axis is at least 1/20 the height of said base sheet material at said axis.

8. The device of claim 7 wherein said length of said wind shield is no greater than about 9/10 the height of said sheet material at said axis and said wind shield is medially located between the extremities of the height of said sheet material at said axis.

9. The device of claim 1 wherein said holding means comprises a non-rotating frame member, said device additionally including a mounting bar having one end fixed to said frame member.

10. The device of claim 9 wherein the other end of said mounting bar is fixed to a bicycle, said mounting bar being non-resilient and deformable by hand bending into a variety of selected shapes.

11. The device of claim 1, additionally characterized by being an eye-catching attention-getting safety device having patterned areas of reflex-reflecting material and of non-reflex-reflecting material on opposite sides of said base sheet material, the patterned area of reflex-reflecting material on one side of said sheet material being relatively displaced in axial relationship from the patterned area of reflex-reflecting material on the other side thereof, at least 50% of the area coverage of each said reflex-reflecting pattern on opposite sides of said sheet material being in locations relative to said axis means which do not coincide as viewed during rotation of said rotatable part, the patterned areas of non-reflex-reflecting material on opposite sides of said sheet material also being relatively displaced in axial relationship to each other, whereby substantially all practical rotation speeds for said primary rotatable part about said predetermined axis provide a viewer under reflex-reflecting conditions with the impression of shifting flash patterns of light return suggestive of the patterns of said areas of reflex-reflecting material.

12. The device of claim 11 wherein said wind shield is substantially transparent.

13. The device of claim 11 wherein said wind shield is substantially opaque.

14. The device of claim 11 wherein said holding means for said axis means comprises a frame structure and said wind shield is fixed to said frame structure.

15. The device of claim 11 wherein said wind shield is curved in a manner approximating the curvature of said rotation-generated curved surface.

16. The device of claim 11 wherein the width of said wind shield in terms of the circumference of said rotation-generated curved surface is between approximately 1/20 and ¼ of said circumference.

17. The device of claim 11 wherein the length of said wind shield in terms of the height of said base sheet material along said predetermined axis is at least 1/20 the height of said base sheet material at said axis.

18. The device of claim 17 wherein said length of said wind shield is no greater than about 9/10 the height of said sheet material at said axis and said wind shield is medially located between the extremities of the height of said sheet material at said axis.

19. The device of claim 11 wherein said holding means comprises a non-rotating frame member, said device additionally including a mounting bar having one end fixed to said frame member.

20. The device of claim 19 wherein the other end of said mounting bar is fixed to a bicycle, said mounting bar being non-resilient and deformable by hand bending into a variety of selected shapes.

* * * * *